United States Patent [19]
Masuda

[11] 3,949,641
[45] Apr. 13, 1976

[54] SELF-DRILLING SCREW
[75] Inventor: George K. Masuda, Hamilton, Canada
[73] Assignee: The Steel Company of Canada, Limited, Hamilton, Canada
[22] Filed: Nov. 4, 1974
[21] Appl. No.: 520,723

[52] U.S. Cl. .................................................. 85/41
[51] Int. Cl.² ........................................ F16B 25/00
[58] Field of Search .............. 85/41, 43, 46, 30, 47, 85/1 P

[56] References Cited
UNITED STATES PATENTS

| 126,366 | 4/1872 | Wills | 85/43 X |
|---|---|---|---|
| 448,347 | 3/1891 | Jones | 85/41 |
| 1,385,799 | 7/1921 | Smith | 85/37 |
| 1,651,796 | 12/1927 | Arenz | 85/41 |
| 2,263,527 | 11/1941 | Werme | 85/41 X |

FOREIGN PATENTS OR APPLICATIONS

| 1,475,049 | 5/1969 | Germany | 85/41 |
|---|---|---|---|

*Primary Examiner*—Ramon S. Britts
*Attorney, Agent, or Firm*—Sim & McBurney

[57] ABSTRACT

This invention provides a self-drilling screw and a method of making the screw. The screw comprises a shank tapering to a substantial point at one end, a head on the other end, at least one spiral thread, and a flat facet on the point end, the facet being at an angle to the axis of the screw. The method of making the screw includes the steps of heading and roll-threading a blank to provide a screw having a head, a point, and at least one spiral thread, and grinding a flat facet on the point at an angle to the axis of the screw. In a preferred form, the screw is surface-hardened either before or after the grinding.

6 Claims, 3 Drawing Figures

U.S. Patent  April 13, 1976  3,949,641

SELF-DRILLING SCREW

This invention relates generally to self-drilling fasteners which are used to pierce and fasten joints in applications where no pre-drilled or tapped holes have been provided. The fasteners to which this invention relates constitute a category which, in order to be acceptable, must meet certain pre-established specifications. Essentially, the fasteners of this category must drill through a prescribed material within a prescribed length of time. The fixed test conditions of material thickness, hardness, maximum allowable drill time and rpm of the driving mechanism are established criteria in SAE J78 (Self Drilling Tapping Screw Proposed Standard Apr. 28, 1972).

BACKGROUND OF THIS INVENTION

The prior art contains a number of self-drilling fasteners adapted to pierce and fasten joints where no pretapped holes have been provided. Such prior art fasteners tend to fall into one of two categories. The first category is one in which the fastener is provided with an end resembling a drill bit, the threads of the fastener beginning above or behind the drill bit end. The effect of providing such a drill bit end on the fastener is to furnish the fastener with one or more chisel edges which in effect cut and lift the material being removed for the entry of the fastener.

The second category of prior art fastener is one in which the threads or portions of the threads extend substantially down to the entering point, but in which the end of the fastener adjacent the point is provided with grooves or flutes adapted essentially to ream out a hole into which the fastener may enter.

Both of the foregoing categories of prior art fastener tend to be somewhat expensive to manufacture, due to the intricate recesses, grooves, chisel edges, etc. which must be provided.

It is therefore an aspect of this invention to provide a self-drilling fastener capable of meeting the standard criteria established for such fasteners, but which tends to be less expensive to manufacture than the prior art fasteners. It is also an aspect of this invention to provide a method for manufacturing such a self-drilling fastener.

GENERAL DESCRIPTION OF THIS INVENTION

Accordingly, this invention provides a self-drilling screw comprising: a shank tapering to a substantial point at one end, a head on the other end of the shank, at least one spiral thread on said shank, and a flat facet on said substantial point, the facet being at an angle to the axis of the screw.

There is also disclosed a method of making a self-drilling screw, comprising the steps: heading and roll-threading a blank to provide a screw having a head, a point, and at least one spiral thread, and grinding a flat facet on said point at an angle to the axis of the screw.

Preferably, the flat facet is relatively small compared to the diameter of the screw proper.

GENERAL DESCRIPTION OF THE DRAWINGS

One embodiment of this invention is illustrated in the accompanying drawings, in which like numerals denote like parts throughout the several views, and in which.

PARTICULAR DESCRIPTION OF THE DRAWINGS

Figure 1:
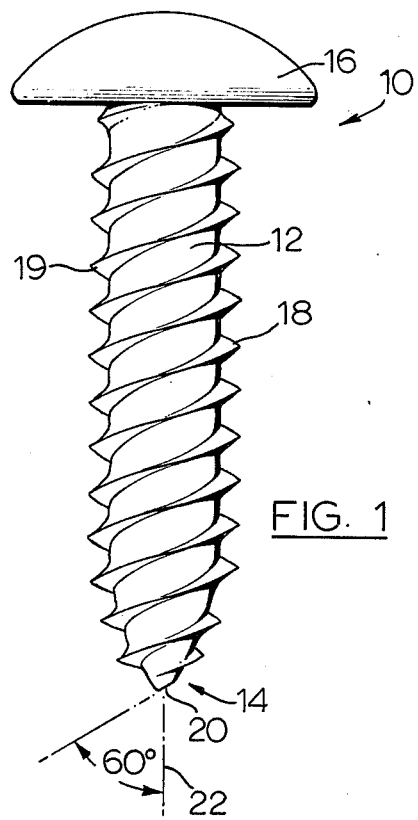
FIG. 1 is an elevational view of a fastener in accordance with this invention.

Attention is first directed to FIG. 1, which shows a self-drilling screw fastener 10 which includes a shank 12 tapering to a substantial point 14 at one end and having a head 16 on the other end. In the embodiment of FIG. 1, two spiral threads 18 and 19 are formed on the shank 12.

The point 14 of the screw fastener 10 has a flat facet 20 which is at an angle to the axis 22 of the screw fastener 10.

In the particular embodiment shown in FIG. 1, the angle between the facet 20 and the axis 22 is substantially 60°, but it will be clear from the subsequent discussion and from FIG. 3 later to be described that a considerable range of angulation between the facet 20 and the axis 22 of the screw fastener 10 may be utilized to advantage.

Figure 2:
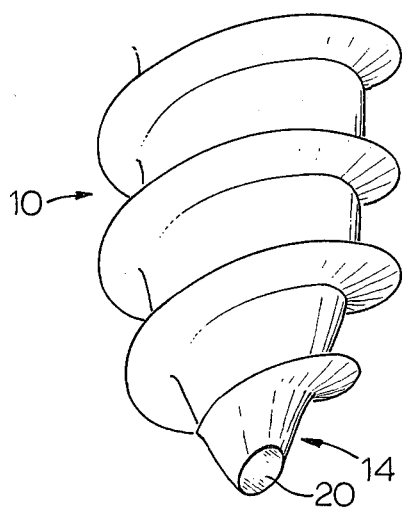
FIG. 2 is a perspective view, to a larger scale, of the piercing end of the fastener of FIG. 1.

FIG. 2 shows a view to a larger scale of the point 14 of the screw fastener 10. The flat facet 20 is viewed obliquely in FIG. 2.

As can be seen in the figures, the flat facet 20 is of relatively small dimension when compared with the shank 12. It is preferred that the facet be of a size such that its largest dimension is less than about 150% of the thread depth, the latter being visible in FIG. 1. It is also preferred that the facet have a largest dimension which is substantially less than the shank diameter at the thread roots.

Although FIG. 1 shows a screw fastener 10 having two spiral threads around the shank 12, it has been found that fasteners with a single spiral thread also perform satisfactorily as self-drilling fasteners when provided with a flat facet of the kind herein disclosed.

The self-drilling screw fastener 10 of FIG. 1 may be manufactured in the following manner. The first step is to head and roll-thread a suitable blank in the conventional manner to provide a screw which has a head, a point, and at least one spiral thread on the shank. The headed and roll-threaded screw fastener is then surface-hardened or case-hardened, for example by the process known as case carburizing.

Next the screw fastener is ground at its point to provide the flat facet 20 shown in FIGS. 1 and 2. The grinding may be performed in a standard rotary grinder, with the fastener set in a guide jig.

The foregoing steps constitute one sequence by which the screw fastener of this invention may be manufactured. Another sequence yielding satisfactory results is one in which the same steps are taken, but the order of the surface-hardening and the grinding is reversed. That is, the grinding may take place prior to the surface hardening.

It is also possible, for certain applications and with certain materials, to dispense with the surface-hardening step altogether.

A number of tests were carried out on screw fasteners of the general shape and configuration of that shown in FIG. 1 of the drawings, which had been ground subsequent to surface-hardening, in order to determine the effect on performance, if any, of a variation in the angle defined between the plane of the flat facet 20 and the axis 22 of the screw fastener 10. Fourteen separate angulations were utilized between 25° and 90° inclusive, the angles differing by 5°. At least ten tests involving ten separate fasteners were made for each angulation category, and for each category an average driving time in seconds was mathematically calculated. For all of the tests, the screw fastener utilized was a standard dry wall screw which had been roll-threaded in the conventional operation, and then case carburized.

Figure 3:
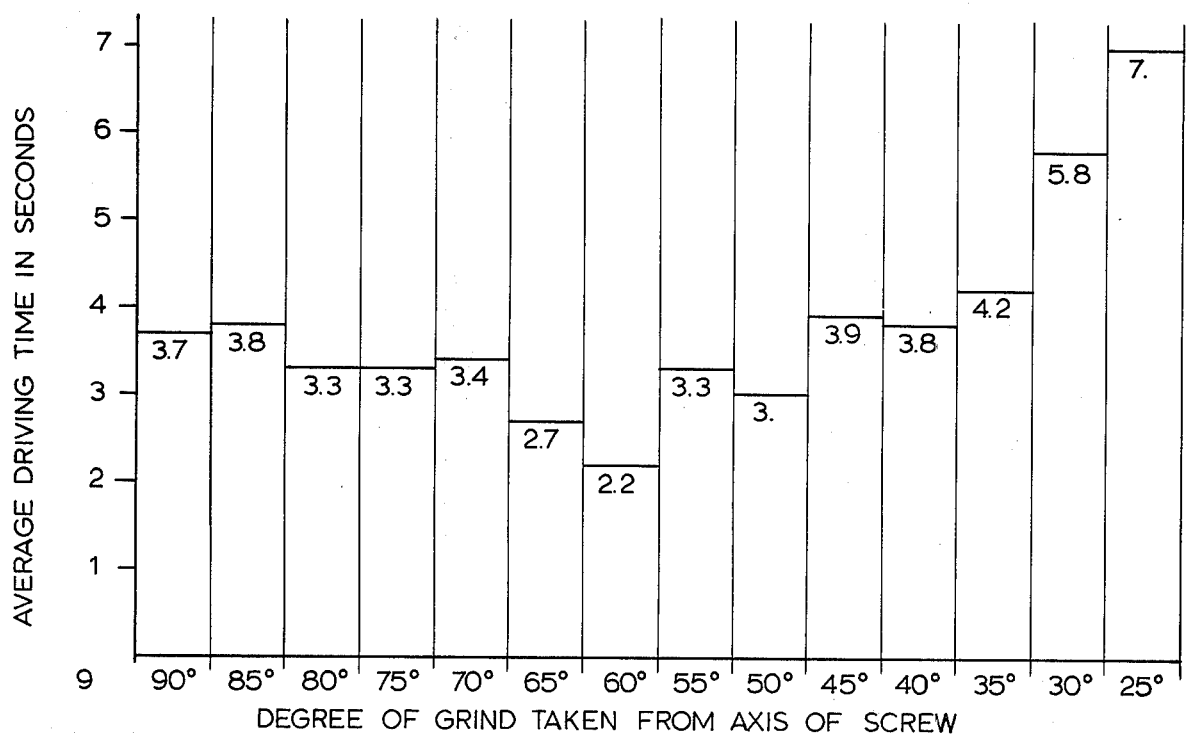
FIG. 3 is a graphical representation of data showing the average driving times for fasteners of this invention having different angles between the facet and the fastener axis.

FIG. 3 shows the results of the tests just described. It will be noted that all angulations between 35° and 90° inclusive yielded average driving times less than 5 seconds. The average driving times for 30° and 25° were 5.8 seconds and 7.0 seconds respectively. Generally speaking, an average driving time less than 5 seconds is considered satisfactory in terms of applicable industrial specifications.

It will be noted in particular that the angulation of 60° produced the shortest average driving time, namely 2.2 seconds.

Thus, while it is considered that any angle will have some advantage over a fastener having no flat facet whatever, the preferred range of angulation is between about 35° and 90°, and the most advantageous angle within the latter range from the point of view of the average driving time is in the region of 60°.

It must be emphasized, however, that the above comparison of different angulations is only secondary to the main distinguishing feature of the screw fastener herein provided, namely the presence of the small angulated flat facet per se. If the fastener shown in FIG. 1 did not have the flat facet 20 ground onto its end, it would be virtually impossible to "start" the fastener into the steel portion of the dry wall construction under normal axial loads. Because the facet is present, a biting edge similar to a curved chisel edge is provided on the end of the fastener. This biting edge is believed to give the start to the threads of the fastener, so that the threads may continue to enter the material in a self-tapping manner. It is also considered that, in cases where the screw fastener of this invention is being self-threaded into a particularly hard material, such as certain high-grade steel plates, it is of further advantage for the screw fastener to be case-hardened (for example by the conventional case carburizing technique) prior to the grinding of the facet 20. It is believed that the combination of the grinding and the case-hardening at the point improves the cutting or chiseling ability of the curved edge of the flat facet 20.

What I claim as my invention is:

1. A self-drilling screw comprising:
   a shank tapering to a substantial point at one end,
   a head on the other end of the shank,
   at least one spiral thread on said shank,
   and a flat facet on said substantial point, the facet being at an angle to the axis of the screw, and having a largest dimension which is less than about 150% of the thread depth.

2. The invention claimed in claim 1, in which the screw is surface-hardened.

3. The invention claimed in claim 1, in which the screw is surface-hardened except for said facet.

4. The invention claimed in claim 1, in which the facet defines with the axis of the screw an angle between 90° and about 25°.

5. The invention claimed in claim 3, in which the facet defines with the axis of the screw an angle greater than about 35°, and in which the facet has a largest dimension which is substantially less than the shank diameter at the thread roots.

6. The invention claimed in claim 5, in which the facet is a smooth face, in which the screw has two spiral threads, and in which the facet defines an angle of about 60° with the axis of the screw.

* * * * *